United States Patent [19]

Sweeny et al.

[11] Patent Number: 4,608,427

[45] Date of Patent: Aug. 26, 1986

[54] METHOD FOR MAKING PBO AND PBT POLYMERS

[75] Inventors: Wilfred Sweeny; Stephanie L. Kwolek, both of Wilmington, Del.

[73] Assignee: E. I. Du Pont de Nemours and Company, Wilmington, Del.

[21] Appl. No.: 746,757

[22] Filed: Jun. 20, 1985

[51] Int. Cl.$^4$ .................... C08G 73/22; C08G 75/32
[52] U.S. Cl. .................... 528/179; 528/183; 528/185; 528/336; 528/337
[58] Field of Search ............... 528/179, 183, 185, 336, 528/337

[56] References Cited

U.S. PATENT DOCUMENTS

| | | | |
|---|---|---|---|
| 3,313,783 | 4/1967 | Iwakura et al. | 528/337 |
| 3,424,720 | 1/1969 | Rudner et al. | 528/183 |
| 3,784,517 | 1/1974 | Hedberg et al. | 528/183 |
| 3,968,085 | 7/1976 | Rabilloud et al. | 528/172 |
| 4,051,108 | 9/1977 | Helminiak et al. | 528/337 |
| 4,108,835 | 8/1978 | Arnold et al. | 528/183 |
| 4,225,700 | 9/1980 | Wolfe et al. | 528/183 |
| 4,377,546 | 3/1983 | Helminiak et al. | 528/183 |
| 4,423,202 | 12/1983 | Choe | 528/337 |
| 4,463,167 | 7/1984 | Choe et al. | 528/337 |

OTHER PUBLICATIONS

James F. Wolfe and Bock H. Loo, F. E. Arnold; RIGID-ROD POLYMERS (Macromolecules) (1981), pp. 14, 915-920.

*Primary Examiner*—Lester L. Lee

[57] ABSTRACT

An improved process for preparing polybenzobisthiazoles and polybenzobisoxazoles involves reacting diethyl, di-n-propyl, diisopropyl or diisobutyl terephthalate rather than terephthalic acid with the appropriate dihydrochloride.

5 Claims, No Drawings

METHOD FOR MAKING PBO AND PBT POLYMERS

BACKGROUND OF THE INVENTION

Polybenzobisthiazole (PBT) and polybenzobisoxazole (PBO) are taught in the prior art as useful in the preparation of high modulus, high strength materials having excellent thermal stability. PBO has been synthesized by the condensation of 4,6-diaminoresorcinol dihydrochloride with terephthalic acid in polyphosphoric acid. PBT has been synthesized by a similar process from 2,5-diamino-1,4-benzenedithiol dihydrochloride and terephthalic acid (see Wolfe, U.S. Pat. No. 4,225,700). The use of terephthalic acid of small particle size is one of the conditions determined in the art to be necessary to afford PBT with high inherent viscosity. Macromolecules 1981, 14, 915–920 reports the use of terephthalic acid that had been reduced to a particle size of 95% under 10 μm (micrometers) by an air impact method. This fine particle size is required to help overcome the low solubility of terephthalic acid in polyphosphoric acid which limits its rate of reaction. The present invention provides an improved technique for providing the terephthalic acid in a more readily reactive form.

SUMMARY OF THE INVENTION

In accordance with the present invention, polybenzobisthiazoles are prepared by reacting in a polyphosphoric acid medium, 2,5-diamino-1,4-benzenedithiol dihydrochloride with a diester of the group consisting of diethyl, di-n-propyl, diisopropyl or diisobutyl terephthalate, 4,4[1] bibenzoate or 2,6-naphthoate, and polybenzobisoxazoles are prepared by reacting in a polyphosphoric acid medium 4,6-diaminoresorcinol dihydrochloride with any of the same diesters.

DETAILED DESCRIPTION OF THE INVENTION

Both 2,5-diamino-1,4-benzenedithiol dihydrochloride and 4,6-diaminoresorcinol dihydrochloride are known in the art (see previously mentioned Wolfe patent) and have been employed in the manufacture of PBT and PBO respectively by reaction with terephthalic acid. The reaction involves substantially stoichiometric proportions of the reactants. Polyphosphoric acid has been conventionally used as the reaction medium since it is a solvent for the resulting polymers. The polyphosphoric acid can be freshly prepared or if desired can be purchased from commercial sources. Unfortunately, terephthalic acid dissolves with difficulty in polyphosphoric acid and so it has been a practice in the art to purchase terephthalic acid and to reduce the particle size. An air impact method has been used to bring the particle size to a level where 95% is less than 10 μm. Even with the reduction in particle size it is found that the slow dissolution is the rate controlling step.

Applicant has found that the use of diethyl, di-n-propyl, diisopropyl or diisobutyl terephthalate in place of terephthalic acid overcomes the limitations of terephthalic acid, e.g., need to reduce particle size, etc. The aforementioned esters in polyphosphoric acid are thermally cleavable in situ below 150° C. to terephthalic acid. High molecular weight polymer is obtained. Dimethyl terephthalate is not equivalent to the aforementioned diethyl, di-n-propyl, diisopropyl or diisobutyl esters in preparing high molecular weight polymer because of sublimation or difficulties arising from its better thermal stability in the presence of acid. The improvements of the present invention can also be achieved through use of the diethyl, di-n-propyl, diisopropyl or diisobutyl esters of 4,4[1]-bibenzoic acid or 2,6-naphthoic acid in place of the free acids.

Diisopropyl terephthalate can be prepared as follows:

Terephthaloyl chloride (200 g) is added to two liters of isopropanol at room temperature with stirring in a fume hood with good ventilation. After 1 hour the solution is evaporated on a steam bath to about 500 cc and cooled to room temperature. A colorless crystalline product is obtained and recovered by filtration. After washing with hexane, it is recrystallized from the same solvent.

Polymerization in polyphosphoric acid is generally carried out at temperatures from about 150° C. to about 200° C. In the example below, the phosphoric acid is present to assist in the dehydrochlorination.

The following example is illustrative of the invention.

EXAMPLE

In a round-bottomed flask were placed 57.3 grams of 85.4% phosphoric acid (to facilitate handling) and 133.7 grams of 115% polyphosphoric acid. This material was stirred for 3 hours at 100° C. in vacuo (~1 mm. Hg), then cooled and placed in a dry box for storage. A flamed and nitrogen vented, three neck "resin" kettle equipped with a basket-type stirrer, drying tube and a gas-inlet tube was placed in the dry-box and 45.3 grams of the above acid mixture was transferred into it, along with 11.43 grams (0.054 mole) of dried 4,6 diaminoresorcinol dihydrochloride. The resin kettle was removed to a fume hood and the stirrer was connected to an air-driven motor. The reaction mixture was stirred and heated with an oil bath as follows:

0.5 hr./55° C./Argon bleed
0.75 hr./55° C./350 to 250 mm Hg.
1.5 hr./62° C./350 mm Hg.
0.5 hr./62° C./160 mm Hg.
0.5 hr./62° C./10 mm Hg.
18 hr./70° C./ca. 1 mm Hg.

The solution was cooled to room temperature, blanketed with Argon and transferred to a dry-box, where 13.43 grams (0.054 mole) of diisopropyl terephthalate (deaerated 28 hr./ca. 1 mm Hg.) was added with hand stirring. The resin kettle was removed from the dry-box, connected to the stirrer motor and the mixture was stirred and heated for ½ hr./30°–50° C./ca. 1 mm Hg. The solution was cooled again to room temperature, blanketed with Argon and transferred to a dry-box where 30.5 g of $P_2O_5$ (deaerated 18 hr./ca.1 mm Hg.) was added with the hand-stirring. The resin kettle was removed from the dry-box, reconnected to the stirrer motor in the hood and the mixture stirred and heated as follows:

0.5 hr./30°–70° C./1 mm Hg.
2 hr./100° C./Argon bleed
1.25 hr./135° C./Argon atmosphere
1.0 hr./135°–185° C./Argon atmosphere
17.5 hr./195° C./Argon atmosphere The resulting solution was anisotropic and had a golden color. The polymer was separated by precipitation with water and washed many times with water in a blender and filtered after each wash. The final washes consisted of aqueous sodium bicarbonate, water and acetone in sequence in a blender followed by filtration after each wash. The resulting polymer was dried overnight in a vacuum oven at ca. 90° C. with a nitrogen bleed. The inherent viscosity of the polymer (0.1% solution in methane sulfonic acid) was 8.1.

For comparison, substitution of 8.91 grams (0.054 mole) of terephthalic acid in the above procedure (in place of diisopropyl terephthalate) was carried out. Deaerated terephthalic acid (8.912 g, 0.054 mole) was added to the resin kettle. The terephthalic acid had previously been micronized to an average particle size of 95% < 10 μm and dried at 120° C./24 hr./vacuum. The resin kettle was reconnected with the stirrer motor in the fume hood and the mixture was stirred for 0.5 hr./25°–50° C./ca. 1 mm Hg. vacuum phosphorus pentoxide (30.5 g) was added in the same manner as described in the above procedure, however, the heating cycle was as follows:

0.5 hr./70° C./ca. 1 mm Hg.
1 hr./100° to 160° C./Argon atm.
3 hr./185° C./Argon atm.
19 hr./195° C./Argon atm.

Substantially the same result was achieved (inh. visc. was 7.1) as in the former case. The tedious preparation of the terephthalic acid for the reaction was obviated.

Substitution of 2,5 diamino-1,4-benzenedithiol dihydrochloride in the above procedure would lead to PBT.

We claim:

1. A method for preparing polybenzobisthiazoles and polybenzobisoxazoles which comprises reacting in a polyphosphoric acid medium, and in substantially stoichiometric proportions, 2,5-diamino-1,4-benzenedithiol dihydrochloride or 4,6-diaminoresorcinol dihydrochloride with a diester of the group consisting of diethyl, di-n-propyl, diisopropyl or diisobutyl terephthalate, 4,4¹-bibenzoate or 2,6-naphthoate.

2. A method according to claim 1 wherein 2,5-diamino-1,4-benzenedithiol dihydrochloride is reacted with the diester.

3. A method according to claim 2 wherein the diester is diisopropyl terephthalate.

4. A method according to claim 1 wherein 4,6-diaminoresorcinol dihydrochloride is reacted with the diester.

5. A method according to claim 4 wherein the diester is diisopropyl terephthalate.

* * * * *